United States Patent
Ring et al.

(10) Patent No.: US 11,675,043 B1
(45) Date of Patent: Jun. 13, 2023

(54) WIRELESS TRACKING AND RANGING FOR CARGO SYSTEMS

(71) Applicant: GOODRICH CORPORATION, Charlotte, NC (US)

(72) Inventors: Ryan C. Ring, Carrington, ND (US); Kevin L. Setterstrom, Jamestown, ND (US); Scott P. Harms, Ypsilanti, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/537,130

(22) Filed: Nov. 29, 2021

(51) Int. Cl.
*G01S 5/10* (2006.01)
*G08B 21/18* (2006.01)

(52) U.S. Cl.
CPC .............. *G01S 5/10* (2013.01); *G08B 21/182* (2013.01)

(58) Field of Classification Search
CPC ................................ G01S 5/10; G08B 21/182
See application file for complete search history.

(56) References Cited

U.S. PATENT DOCUMENTS

| | | | |
|---|---|---|---|
| 7,198,227 B2 | 4/2007 | Olin et al. | |
| 9,244,148 B1 | 1/2016 | Sternowski | |
| 9,607,281 B2 | 3/2017 | Lee et al. | |
| 2005/0246132 A1* | 11/2005 | Olin | B64D 9/00 702/174 |
| 2006/0038077 A1 | 2/2006 | Olin et al. | |
| 2010/0100225 A1* | 4/2010 | Reed | B64D 9/00 701/124 |
| 2021/0110122 A1* | 4/2021 | Volkerink | H04B 17/318 |

FOREIGN PATENT DOCUMENTS

| | | |
|---|---|---|
| EP | 9244148 | 9/2015 |
| WO | 2006078285 | 7/2006 |

OTHER PUBLICATIONS

European Patent Office, European Search Report dated Mar. 29, 2023 in Application No. 22208290.1.

* cited by examiner

*Primary Examiner* — Ojiako K Nwugo
(74) *Attorney, Agent, or Firm* — Snell & Wilmer L.L.P.

(57) ABSTRACT

A cargo handling system may utilize a leaky feeder antenna grid to determine the location of a ULD, a mobile cargo controller, or both within a cargo compartment. This location determination may be used for any appropriate purpose. For instance, the noted location determinations may be used to alert an operator of an approaching ULD, to terminate motion of an approaching ULD, or both.

12 Claims, 9 Drawing Sheets

WIRELESS TRACKING AND RANGING FOR CARGO SYSTEMS

FIELD

The present disclosure generally relates to the field of cargo handling system and, more particularly, to determining a location of one or more objects in a cargo compartment.

BACKGROUND

Cargo handling or loading systems currently in circulation within the industry do not have the ability to wirelessly track and range users or cargo. The tracking and location information in these systems is currently being done manually by a loader who takes note of the specific unit load device (ULD) location. The loader is also confined to a main control panel (MCP) where a joystick resides. The loader can then control the movement of the cargo from that fixed location.

Once the loader has completed loading the cargo, the location information must be manually relayed and stored per the load plan. This adds time and waste to the loading process. Additionally, since the loader is in a fixed location, it is more difficult to visually inspect latches and the movement of cargo during the loading process.

SUMMARY

A cargo handling or loading system is presented herein. Both the configuration of such a cargo handling system and the operational characteristics of such a cargo handling system are within the scope of this Summary.

A cargo handling system may be used in conjunction with a cargo compartment (e.g., of an aircraft), for instance to load cargo into the cargo compartment and to unload cargo from the cargo compartment. One or more unit load devices or ULDs may be disposed within the cargo compartment. A mobile cargo controller may be used by one or more operators/loaders within the cargo compartment to move ULDs to one or more locations within the cargo compartment. The location of a given ULD, of a given mobile cargo controller, or both may be determined at one or more times.

A "ULD", as used herein, includes a container, pallet, or other cargo of any size, shape, configuration, and/or type. A "mobile cargo controller", as used herein, includes a portable and/or hand-held device that may be moved throughout the cargo compartment and includes one or more actuators (e.g., buttons; a joystick) for moving a ULD in a desired manner.

A determined location of the ULD and a determined location of the mobile cargo controller may be used to issue one or more alerts (e.g., to an operator/user of the corresponding mobile cargo controller) of any appropriate type (e.g., audible, tactile (e.g., vibration), and/or visual), to terminate/suspend movement of the ULD in the cargo compartment, or both. For instance, if the determined location of the ULD and the determined location of the mobile cargo controller are within a second predetermined distance, one or more of the noted alerts may be issued. If the determined location of the ULD and the determined location of the mobile cargo controller are within a first predetermined distance, movement of the ULD within the cargo compartment may be terminated/suspended, including where the first predetermined distance is smaller (of a smaller magnitude) than the second predetermined distance. As such an operator may be alerted of an approaching ULD prior to movement of this ULD being terminated/suspended.

If the determined location of the ULD and the determined location of the mobile cargo controller are associated with a common zone of the cargo compartment, one or more of the noted alerts may be issued. If the determined location of the ULD and the determined location of the mobile cargo controller are associated with a common zone of the cargo compartment, movement of the ULD within the cargo compartment may be terminated/suspended. These may be implemented individually or in combination.

The ULD, the mobile cargo controller, or both may include any appropriate transmitter (e.g., an RFID tag; a transceiver). Such a transmitter may be passive (in which case a signal is emitted in response to receipt of a signal) or active (e.g., signals are issued in accordance with the configuration of the transmitter. Signal that are sent by a given transmitter may identify the corresponding ULD/mobile cargo controller to the cargo handling system. Signals that are sent from the transmitter of the ULD and the mobile cargo controller may be used to determine their respective locations within the cargo compartment. For instance, a leaky feeder antenna grid may be incorporated by the cargo compartment. Such a leaky feeder antenna grid may include a first plurality of longitudinal antennas that extend longitudinally in a first dimension (e.g., a length dimension of the cargo compartment) and a second plurality longitudinal antennas that extend longitudinally in a second dimension (e.g., a width dimension of the cargo compartment) that is orthogonal to the first dimension. The proportionality of the strength of signals received by a pair of longitudinal antennas and the spacing between these longitudinal antennas (as well as possibly the known location of these longitudinal antennas in the cargo compartment) may be used to determine the position of the corresponding ULD/mobile cargo controller within the cargo compartment. The location of the ULD/mobile cargo controller within the cargo compartment for each of the first and second dimensions may be separately determined.

Various aspects of the present disclosure are also addressed by the following examples and in the noted combinations:

1. A method of operating a cargo handling system, comprising:
   determining a location of a unit load device (ULD) within a cargo compartment;
   moving said ULD within said cargo compartment; and
   determining a location of a mobile cargo controller within said cargo compartment.

2. The method of example 1, wherein said moving comprises using said mobile cargo controller.

3. The method of any of examples 1-2, further comprising:
   terminating motion of said ULD when said ULD is determined to be within a first predetermined distance of said mobile cargo controller.

4. The method of example 3, further comprising:
   issuing an alert when said ULD is determined to be within a second predetermined distance of said mobile cargo controller, wherein said second predetermined distance is greater than said first predetermined distance.

5. The method of any of examples 1-2, further comprising:
   terminating motion of said ULD when said ULD and said mobile cargo controller are determined to be in a common zone of said cargo compartment.

6. The method of any of examples 1-2, further comprising:
issuing an alert when said container and said mobile cargo controller are determined to be within a predetermined distance of each other.

7. The method of any of examples 1-2, further comprising:
issuing an alert when said ULD and said mobile cargo controller are determined to be in a common zone of said cargo compartment.

8. The method of any of examples 1-7, wherein said determining for said ULD comprises transmitting a first signal from a first transmitter incorporated by said ULD, and wherein said determining for said mobile cargo controller comprises transmitting a second signal from a second transmitter incorporated by said mobile cargo controller.

9. The method of example 8, wherein a first dimension and a second dimension are orthogonal to each other, and wherein said determining for said ULD comprises determining a location of said ULD in said second dimension comprising using:
a first received signal strength indicator (RSSI) value corresponding with said first signal received by a first longitudinal antenna that extends longitudinally in said first dimension;
a second RSSI value corresponding with said first signal received by a second longitudinal antenna that extends longitudinally in said first dimension, wherein said first longitudinal antenna and said second longitudinal antenna are parallel; and
a spacing between said first longitudinal antenna and said second longitudinal antenna.

10. The method of example 9, wherein said determining for said ULD comprises determining a location of said ULD in said first dimension comprising using:
a third RSSI value corresponding with said first signal received by a third longitudinal antenna that extends longitudinally in said second dimension;
a fourth RSSI value corresponding with said first signal received by a fourth longitudinal antenna that extends longitudinally in said second dimension, wherein said third longitudinal antenna and said fourth longitudinal antenna are parallel; and
a spacing between said third longitudinal antenna and said fourth longitudinal antenna.

11. The method of example 10, wherein said determining for said mobile cargo controller comprises determining a location of said mobile cargo controller in said second dimension comprising using:
a fifth received signal strength (RSSI) value corresponding with said second signal received by said first longitudinal antenna;
a sixth RSSI value corresponding with said second signal received by said second longitudinal antenna; and
said spacing between said first longitudinal antenna and said second longitudinal antenna.

12. The method of example 11, wherein said determining for said mobile cargo controller comprises determining a location of said mobile cargo controller in said first dimension comprising using:
a seventh RSSI value corresponding with said second signal received by said third longitudinal antenna;
an eighth RSSI value corresponding with said second signal received by said fourth longitudinal antenna; and
said spacing between said third longitudinal antenna and said fourth longitudinal antenna.

13. The method of any of examples 10-12, wherein each of said first longitudinal antenna, said second longitudinal antenna, said third longitudinal antenna, and said fourth longitudinal antenna comprises a leaky feeder antenna.

14. The method of any of examples 1-8, wherein said determining for each of said ULD and said mobile cargo controller comprises separately determining a location in a first dimension and a location in a second dimension that is orthogonal to said first dimension.

15. The method of any of examples 1-8 wherein said determining for each of said ULD and said mobile cargo controller comprises using a first plurality of longitudinal antennas that extend longitudinally in a first dimension and a second plurality of longitudinal antennas that extend longitudinally in a second dimension that is orthogonal to said first dimension.

16. The method of example 15, wherein each longitudinal antenna of said first plurality and said second plurality comprises a leaky feeder antenna.

17. The method of any of examples 1-8, wherein said determining for each of said container and said mobile cargo controller comprises using a leaky feeder antenna grid.

18. The method of example 17, wherein said leaky feeder antenna grid system comprises a plurality of leaky feeder antennas.

19. A cargo handling system, comprising:
a cargo compartment;
a leaky feeder antenna grid within said cargo compartment; and
a location determination module configured to determine an object location, when within said cargo compartment, within a first dimension based upon a signal received by said leaky feeder antenna grid at each of two different locations that are spaced in a second dimension that is orthogonal to said first dimension, and is further configured to determine the object location, when within said cargo compartment, within said second dimension based upon a signal received by said leaky feeder antenna grid at each of two different locations that are spaced in said first dimension, wherein said location determination module comprises a processor.

20. The cargo handling system of example 19, wherein said leaky feeder antenna grid comprises:
a first longitudinal antenna extending longitudinally in said first dimension;
a second longitudinal antenna extending longitudinally in said first dimension and parallel to said first longitudinal antenna;
a third longitudinal antenna extending longitudinally in a second dimension;
a fourth longitudinal antenna extending in said second dimension and parallel to said third longitudinal antenna;
a first module operatively interconnected with said first longitudinal antenna;
a second module operatively interconnected with said second longitudinal antenna;
a third module operatively interconnected with said third longitudinal antenna;
a fourth module operatively interconnected with said fourth longitudinal antenna;
wherein said location determination module is configured to determine the object location, when within said cargo compartment, based upon a received signal strength indicator (RSSI) input received from each of said first module, said second module, said third module, and said fourth module, a spacing between said first longitudinal antenna and said second longitudinal antenna, and a spacing between said third longitudinal antenna and said fourth longitudinal antenna.

21. The cargo handling system of example 20, wherein each of said first longitudinal antenna, said second longitudinal antenna, said third longitudinal antenna, and said fourth longitudinal antenna comprises a leaky feeder antenna.

22. The cargo handling system of any of examples 20-21, wherein said location determination module is configured to separately determine the object location, when within said cargo compartment, within each of said first dimension and said second dimension.

23. The cargo handling system of any of examples 20-22, wherein each of said first module, said second module, said third module, and said fourth module is configured to determine a received signal strength indicator value of a signal received from said first longitudinal antenna, said second longitudinal antenna, said third longitudinal antenna, and said fourth longitudinal antenna, respectively.

24. The cargo handling system of any of examples 20-23, wherein each of said first module, said second module, said third module, and said fourth module comprises a remote control panel.

25. An aircraft comprising the cargo handling system of any of examples 19-24.

26. A method for determining a location of a first object in a cargo compartment, comprising:
transmitting a first signal from a first transmitter incorporated by said first object;
receiving said first signal at a first longitudinal antenna that extends longitudinally in a first dimension;
receiving said first signal at a second longitudinal antenna that extends longitudinally in said first dimension, wherein said first longitudinal antenna and said second longitudinal antenna are parallel;
determining a first received signal strength (RSSI) value from said first signal received by said first longitudinal antenna;
determining a second received signal strength (RSSI) value from said first signal received by said second longitudinal antenna;
computing a position of said first object in a second dimension using said first RSSI value, said second RSSI value, and a spacing between said first longitudinal antenna and said second longitudinal antenna;
receiving said first signal at a third longitudinal antenna that extends longitudinally in said second dimension;
receiving said first signal at a fourth longitudinal antenna that extends longitudinally in said second dimension, wherein said third longitudinal antenna and said fourth longitudinal antenna are parallel;
determining a third received signal strength (RSSI) value from said first signal received by said third longitudinal antenna;
determining a fourth received signal strength (RSSI) value from said first signal received by said fourth longitudinal antenna; and
computing a position of said first object in said first dimension using said third RSSI value, said fourth RSSI value, and a spacing between said third longitudinal antenna and said fourth longitudinal antenna.

27. The method of example 26, wherein said first object is selected from the group consisting of a unit load device and a mobile cargo controller.

28. The method of any of examples 26-27, wherein each of said first longitudinal antenna, said second longitudinal antenna, said third longitudinal antenna, and said fourth longitudinal antenna comprises a leaky feeder antenna.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1A:
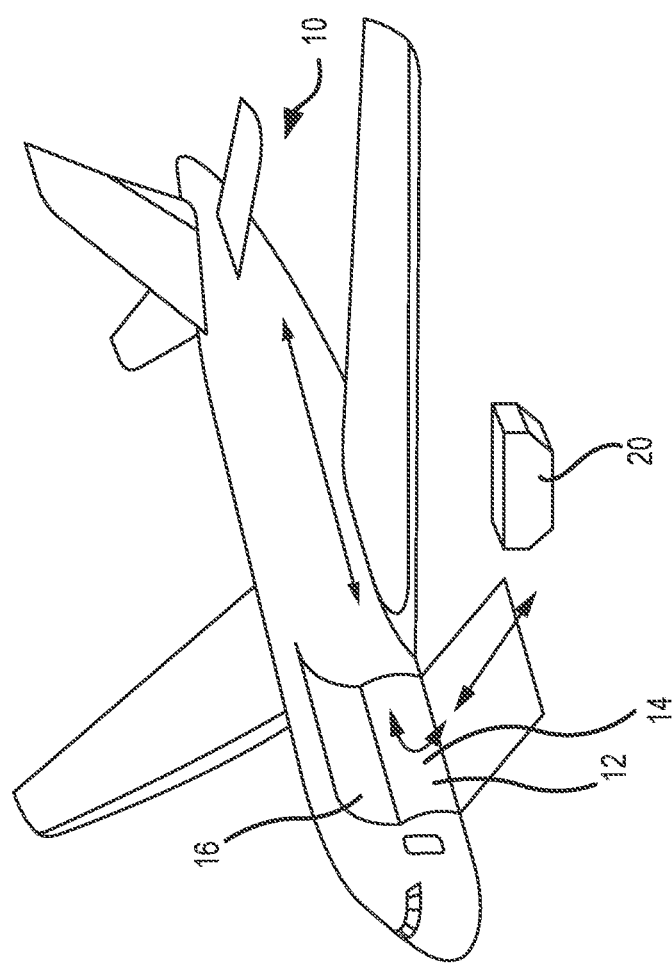
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
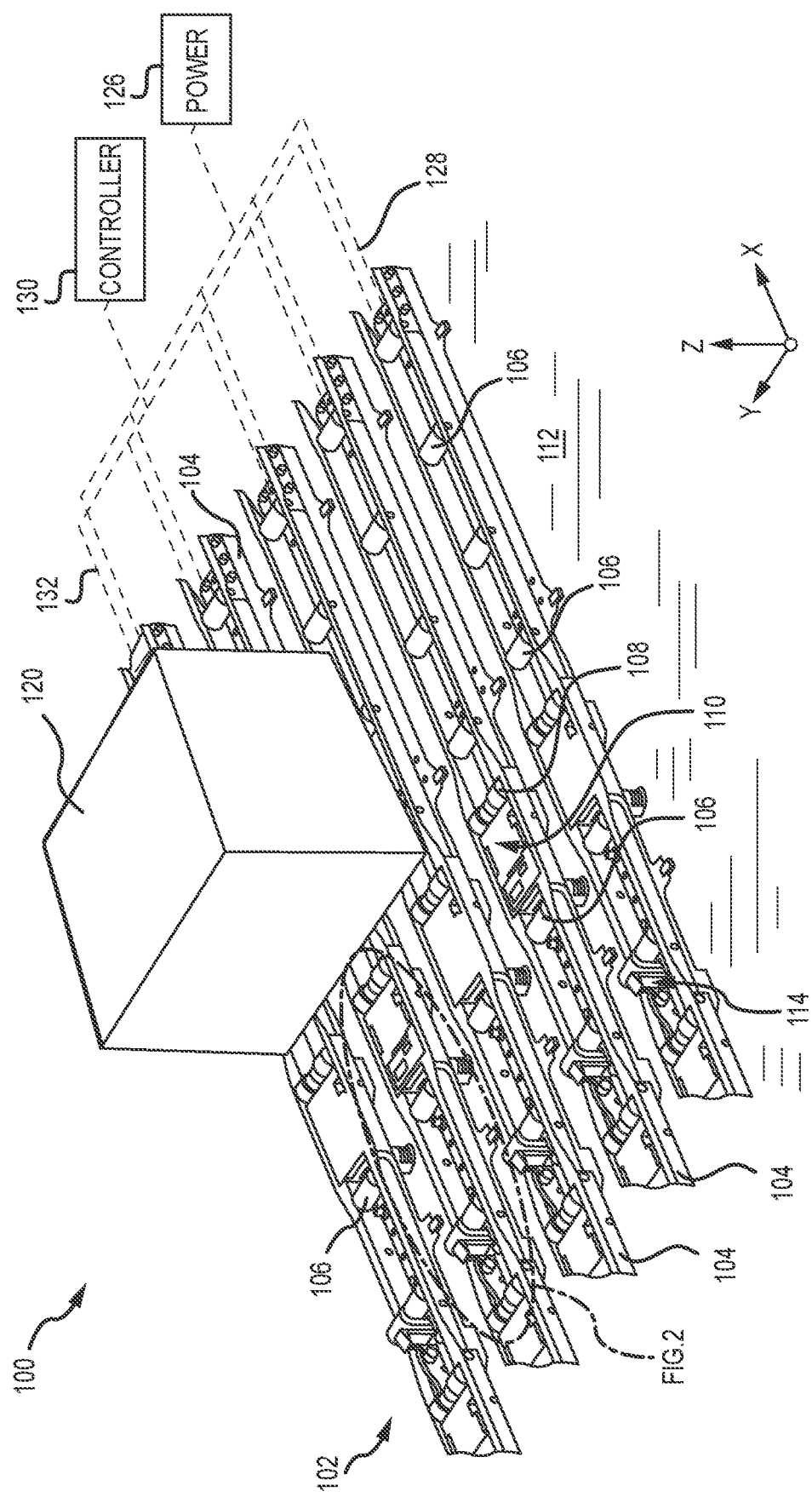
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
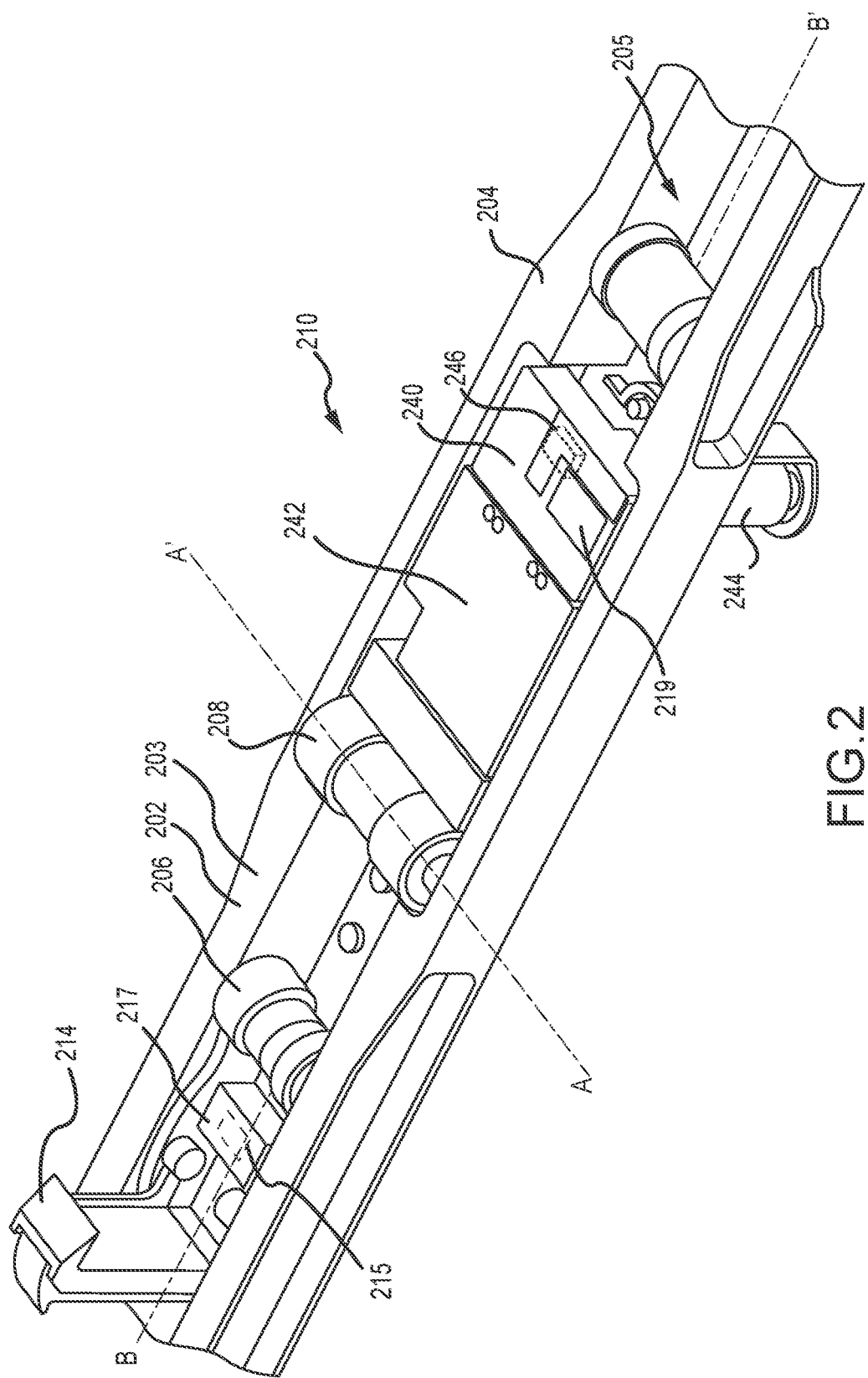
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
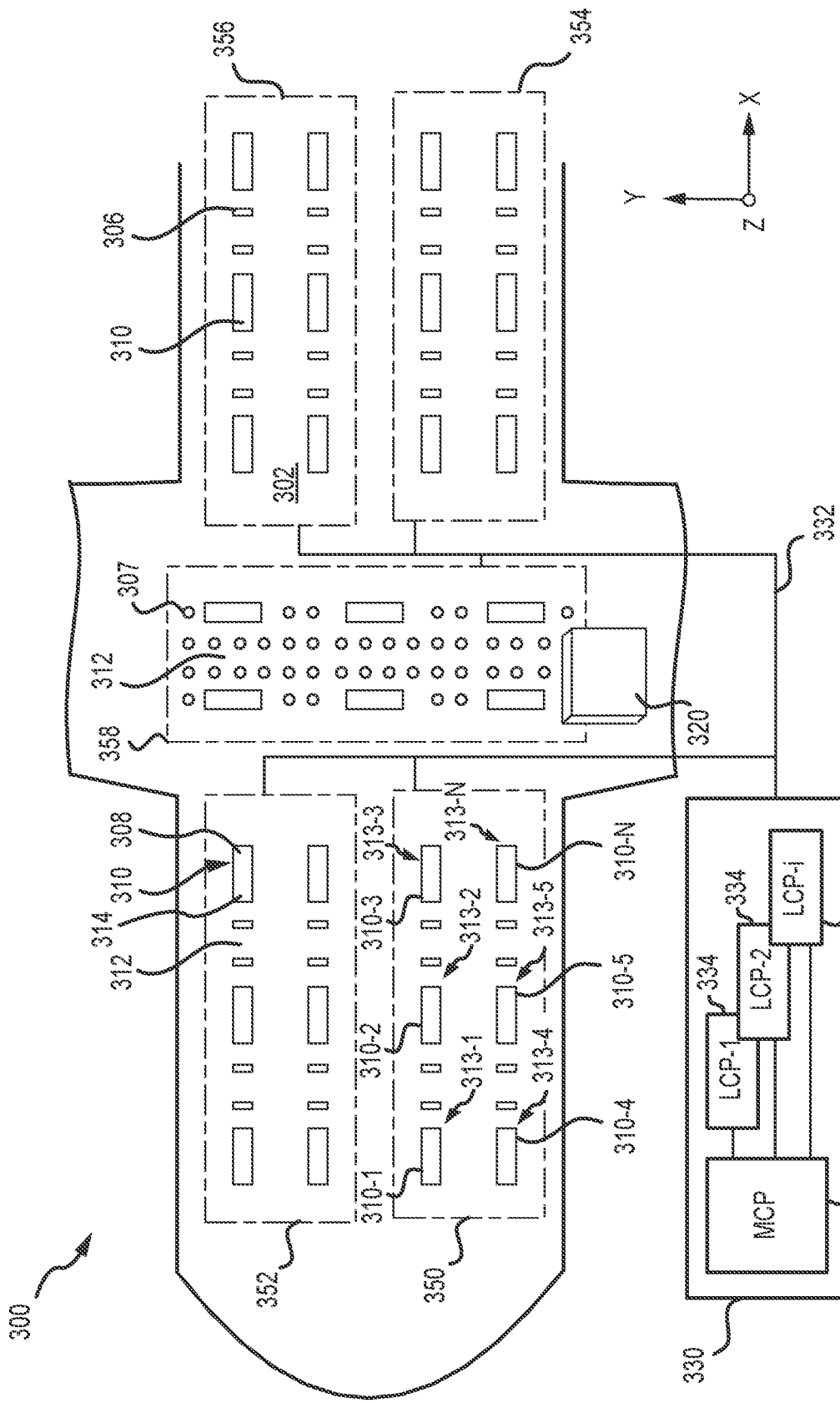
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4:
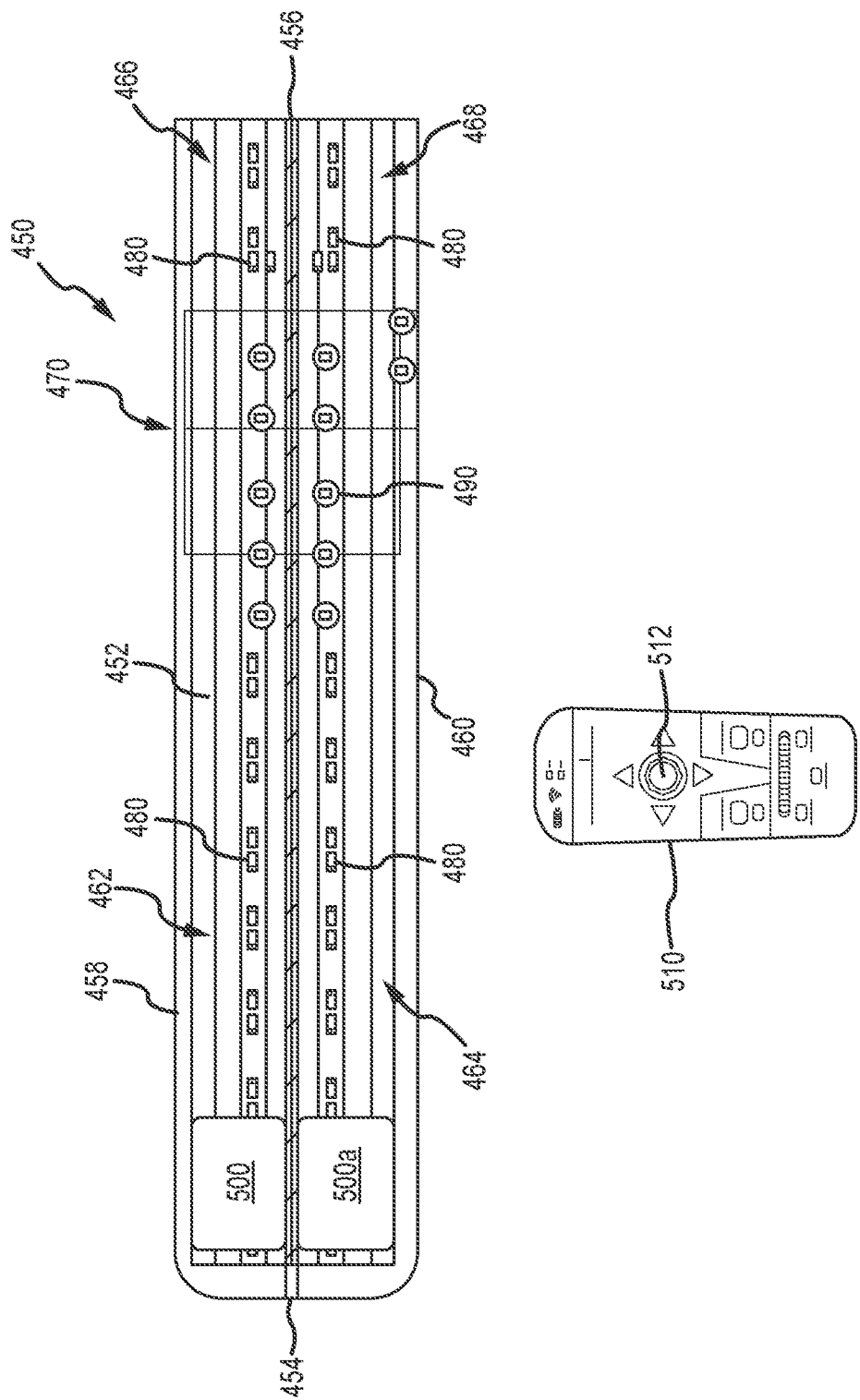
FIG. 4 illustrates a mobile cargo controller in relation to a cargo compartment, in accordance with various embodiments.

FIG. 4 illustrates a mobile cargo controller 510 in relation to a representative cargo compartment 450 (e.g., for an aircraft). The mobile cargo controller 510 includes a cargo motion controller 512 (e.g., a joystick). Moving the cargo motion controller 512 will produce a corresponding movement of a corresponding container 500 (e.g., a ULD), for instance container 500a, along a deck 452 of the cargo compartment 450.

The cargo compartment 450 of FIG. 4 is defined by a forward end 454, an aft or rear end 456 that is spaced from the forward end 454 along a length (or longitudinal) dimension of the cargo compartment 450, a right side 458, and a left side 460 that is spaced from the right side 458 along a width (or lateral) dimension of the cargo compartment 450. The cargo compartment 450 may be characterized as including a plurality of separate cargo zones, including a forward-right cargo zone 462, a forward-left cargo zone 464, an aft-right cargo zone 466, and an aft-left cargo zone 468. The cargo compartment 450 may also be characterized as including a doorway zone 470 (e.g., for loading cargo into and unloading cargo from the cargo compartment 450) that is disposed between a forward cargo compartment (collectively cargo zones 462, 464) and an aft cargo compartment (collectively cargo zones 466, 468).

The deck 452 of the cargo compartment 450 may include a plurality of PDUs 480 (e.g., for advancing cargo along an at least generally axial/linear path relative to the cargo deck 452), as well as a plurality of freighter common turntables or FCTs 490 that are a specific type of PDU (having the ability to axially advance associated cargo, as well as to rotate associated cargo). The FCTs 490 are disposed in the doorway zone 470 of the cargo compartment 450.

Figure 5:
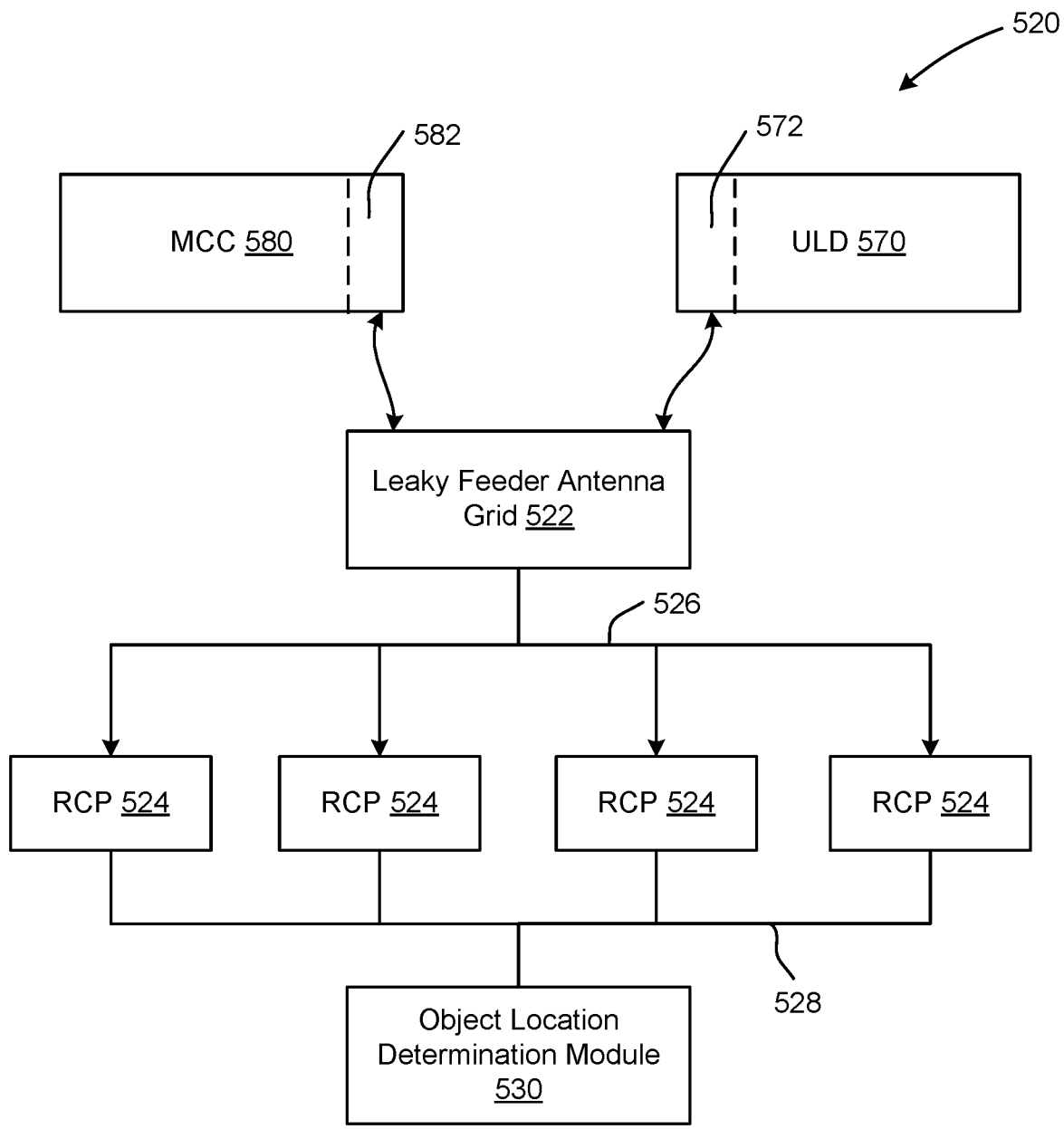
FIG. 5 is a block diagram of a cargo handling system that accommodates object location determination, in accordance with various embodiments.

FIG. 5 illustrates a cargo handling system 520 that includes a leaky feeder antenna grid 522 that is disposed within a cargo compartment (e.g., cargo compartment 14 (FIG. 1A); cargo compartment 450 (FIG. 4); cargo compartment 540 (FIG. 7)), a mobile cargo controller 580 (e.g., mobile cargo controller 510 addressed above with regard to FIG. 4), and at least one ULD 580. The mobile cargo controller 580 may be used by an operator (while in a cargo compartment) to move the ULD 580 within a cargo compartment in a desired/required manner.

The mobile cargo controller 580 may include a transmitter 582 of any appropriate type/configuration (e.g., a transceiver) for wirelessly communicating with the leaky feeder antenna grid 522. The transmitter 582 may be passive or active. In any case, a signal may be emitted/issued by the transmitter 582 on any appropriate basis (e.g., timed; pulsed) and may include an identifier for the mobile cargo controller 580. Similarly, ULD 570 may include a transmitter 572 of any appropriate type/configuration (e.g., a transceiver) for wirelessly communicating with the leaky feeder antenna grid 522. The transmitter 572 may be passive or active. In any case, a signal may be emitted/issued by the transmitter 572 on any appropriate basis (e.g., timed; pulsed) and may include an identifier for the ULD 570. As such, the cargo handling system 520 is able to distinguish between a signal transmitted by the wireless cargo controller 580 and a signal transmitted by the ULD 570.

The cargo handling system 520 of FIG. 5 further includes a plurality of remote control panels 524 (for instance, local control panels 334 discussed above with regard to FIG. 3) that may be located within a cargo compartment. Each remote control panel 524 is operatively connected with the leaky feeder antenna grid 522 by an appropriate communication link 526 (e.g., a wired connection; a communication bus of an aircraft incorporating the cargo handling system 520). As will be discussed in more detail below, each remote control panel 524 may be operatively connected with a particular leaky feeder antenna of the leaky feeder antenna grid 522. Moreover, each remote control panel 524 may compute a received signal strength indicator (RSSI) value for a signal received from the mobile cargo controller 580/ULD 570 and output the same to an object location determination module 530 of the cargo handling system 520 via an appropriate communication link 528 (e.g., a wired connection; a communication bus of an aircraft incorporating the cargo handling system 520). The object location determination module 530 separately determines/computes a location for the relevant ULD 570 or the mobile cargo controller 580 in both a first dimension and a second dimension that are orthogonal to one another. In this regard and as discussed below in relation to FIG. 7, the leaky feeder antenna grid 522 utilizes a plurality of longitudinal/parallel antennas that are spaced from one another in the noted second dimension (to determine the location of an object in the first dimension), as well as a plurality of longitudinal/parallel antennas that are spaced from one another in the noted first dimension (to determine the location of an object in the second dimension).

Figure 6:
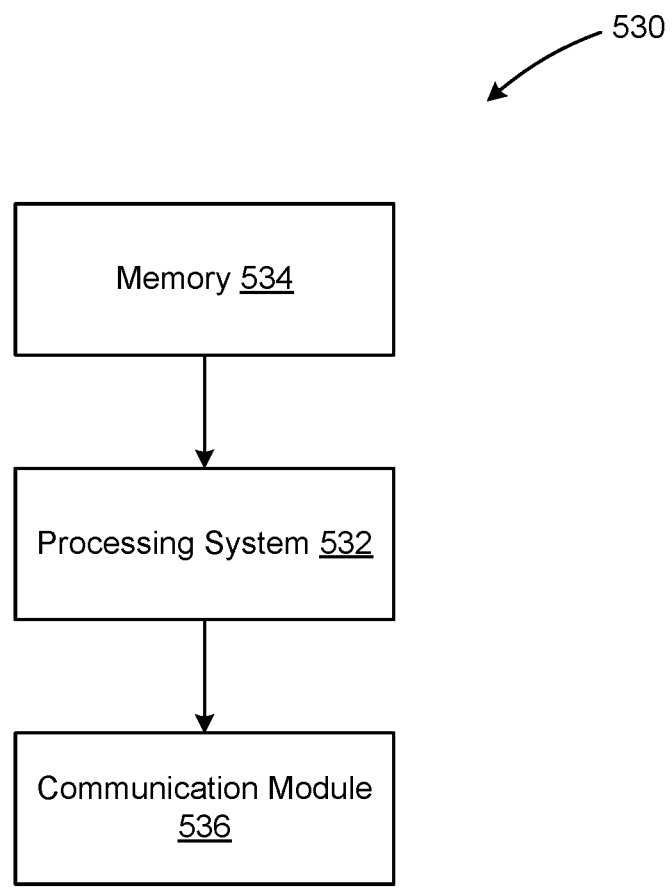
FIG. 6 is a block diagram of an object location determination module for the cargo handling system of FIG. 5, in accordance with various embodiments.

FIG. 6 presents a block diagram of the object location determination module 530 for the cargo handling system 520 of FIG. 5. Components of the object location determination module 530 include memory 534 of any appropriate type/configuration, a processing system 532 (e.g., a central processing unit; one or more processors or microprocessors of any appropriate type and utilizing any appropriate processing architecture and including a distributed processing architecture), and one or more communication modules 536 (e.g., of any appropriate configuration and/or modality; to accommodate communications between the object location determination module 530 and the remote control panels 524; to accommodate transmittal of communications from the object location determination module 530). The object location determine module 530 may be incorporated in any appropriate manner by the cargo handling system 502, for instance by a remote control panel 524, by a master control panel (e.g., MCP 331 of FIG. 3), or as a stand-alone device/component.

Figure 7:
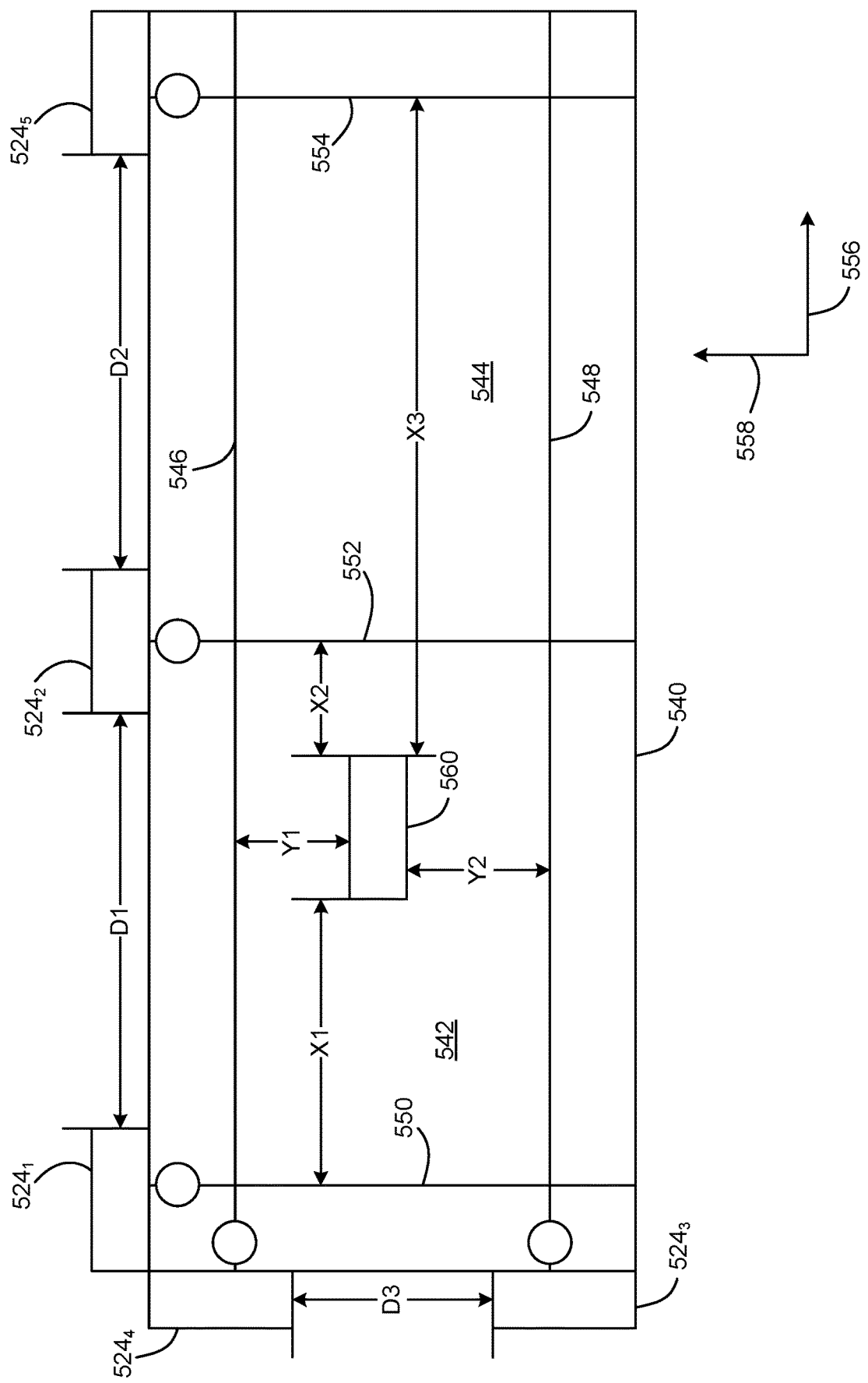
FIG. 7 is a schematic of a cargo compartment with an antenna layout that may be used in conjunction with the cargo handling system of FIG. 5, in accordance with various embodiments.

A representative cargo compartment 540 is presented in FIG. 7 and incorporates a representative arrangement of antennas for the leaky feeder antenna grid 522 of the cargo handling system 520 of FIG. 5. The cargo compartment 540 includes a first longitudinal antenna 546 that extends longitudinally in a first dimension 556 (e.g., an "x" dimension; a length dimension of the cargo compartment 540), along with a second longitudinal antenna 548 that is parallel to the first longitudinal antenna 546 and that also extends longitudinally in the first dimension 556. The first longitudinal antenna 546 may extend along one side of the cargo compartment 540, while the second longitudinal antenna 548 may extend along the opposite side of the cargo compartment 540.

The cargo compartment 540 further includes a third longitudinal antenna 550 that extends longitudinally in a second dimension 558 (e.g., a "y" dimension; a width dimension of the cargo compartment 540) that is orthogonal to the noted first dimension 556, a fourth longitudinal antenna 552 that also extends longitudinally in the second dimension 558 and that is parallel to the third longitudinal antenna 550, and a fifth longitudinal antenna 554 that also extends longitudinally in the second dimension 558 and that is parallel to the third longitudinal antenna 550 and the fourth longitudinal antenna 552. The third longitudinal antenna 550, fourth longitudinal antenna 552, and fifth longitudinal antenna 554 may extend between the two sides of the cargo compartment 540.

The cargo compartment 540 may be of any appropriate size and may incorporate any appropriate number of zones (a first zone 542 and a second zone 544 being illustrated). Each of the above-described longitudinal antennas 546, 548, 550, 552, and 554 may be in the form of a leaky feeder antenna (e.g., a coaxial cable that has portions of its shielding removed for transmission of a radio frequency (RF) signal or the like). The leaky feeder antenna grid 522 may include any appropriate number of longitudinal antennas that extend longitudinally in the second dimension 558. Again, the leaky feeder antenna grid 522 includes a first plurality of longitudinal antennas that extend longitudinally in the first dimension 556 (antennas 546, 548), and a second plurality of longitudinal antennas that extend longitudinally in the second dimension 558 (antennas 550, 552, 554), wherein the first dimension 556 is orthogonal to the second dimension 558.

FIG. 7 illustrates an object 560 (e.g., a ULD 570; a mobile cargo controller 580) disposed at a certain location within the cargo compartment 540, namely within the first zone 542. Multiple objects 560 may be disposed within the cargo compartment 540 at a given time, including where one or more of the objects 560 may be moving. For instance, one or more ULDs 570 may be in the cargo compartment 540, and an operator with a mobile cargo controller 580 may move about the cargo compartment 540 and may use the mobile cargo controller 580 to move a given ULD 570 in the first dimension 556, in the second dimension 558, or both.

Each of the longitudinal antennas 546, 548, 550, 552, and 554 has a dedicated remote control panel 524 that is operatively interconnected therewith—first longitudinal antenna 546 (remote control panel 524₄); second longitudinal antenna 548 (remote control panel 524₃); third longitudinal antenna 550 (remote control panel 524₁); fourth longitudinal antenna 552 (remote control panel 524₂); and fifth longitudinal antenna 554 (remote control panel 524₅). The third longitudinal antenna 550/remote control panel 524₁, fourth longitudinal antenna 552/remote control panel 524₂, and fifth longitudinal antenna 554/remote control panel 524₅ are used by the object location determination module 530 to determine the location of the object 560 in the first dimension 556. The first longitudinal antenna 546/remote control panel 524₄ and the second longitudinal antenna 548/remote control panel 524₃ are used by the object location determination module 530 to determine the location of the object 560 in the second dimension 558. Location determination in the first dimension 556 is done separately from location determination in the second dimension 558 by the object location determination module 530.

A given remote control panel 524 receives a signal sent by the transmitter of the object 560 (e.g., transmitter 572 for the case of a ULD 570; transmitter 582 for the case of a mobile cargo controller 580) via its corresponding/operatively connected antenna 546, 548, 550, 552, and 554. One function of this signal is to identify a particular object 560 to the object location determination module 530 (as there will typically be multiple objects 560 in the cargo compartment 540 and each of which will be transmitting signals). Another function of this signal is to separately determine a location of the object 560 in both the first dimension 556 and the second dimension 558.

Generally the strength of an emitted signal from the object 560, received by two longitudinal antennas that are spaced in the second dimension 558 (longitudinal antennas 550, 552, and 554 in the FIG. 7 configuration), may be used to determine the location of the object 560 in the first dimension 556. Similarly, the strength of an emitted signal from the object 560, received by two longitudinal antennas that are spaced in the first dimension 556 (longitudinal antennas 546 and 548 in the FIG. 7 configuration) and with the object 560 being located therebetween, may be used to determine the location of the object 560 in the second dimension 558. This "signal strength" may be more specifically referred to a "received signal strength indicator" or RSSI, and an RSSI value for the signal received by a given antenna longitudinal antenna 546, 548, 550, 552, and 554 may be computed by its corresponding remote control panel 524. The distance of the object 560 from the two longitudinal antennas should be in proportion to the respective RSSI values.

The object location determination module 530 may store a number of equations in its memory 534 for determination the location of the object 560 in both the first dimension 556 and the second dimension 558. For instance and in relation to the configuration shown in FIG. 7:

$$X1 = \left(\frac{RSSI1}{RSSI2 + RSSI1}\right) * D1; \quad \text{(Equation 1)}$$

$$X2 = \left(\frac{RSSI2}{RSSI1 + RSSI2}\right) * D1; \quad \text{(Equation 2)}$$

$$X3 = \left(\frac{RSSI5}{RSSI1 + RSSI5}\right) * (D1 + D2); \quad \text{(Equation 3)}$$

$$Y1 = \left(\frac{RSSI4}{RSSI3 + RSSI4}\right) * D3; \text{ and} \quad \text{(Equation 4)}$$

$$Y2 = \left(\frac{RSSI3}{RSSI4 + RSSI3}\right) * D3; \text{ where:} \quad \text{(Equation 5)}$$

RSSI1 is the RSSI value associated with the signal received by the remote control panel 524₁;

RSSI2 is the RSSI value associated with the signal received by the remote control panel 524₂;

RSSI3 is the RSSI value associated with the signal received by the remote control panel $524_3$;

RSSI4 is the RSSI value associated with the signal received by the remote control panel $524_4$; and RSSI5 is the RSSI value associated with the signal received by the remote control panel $524_5$.

The RSSI values used by Equations 1-5 are normalized versions to account for the path loss dynamic range over the distance between the corresponding antennas. A given remote control panel will receive a signal from a given antenna, and the remote control panel will acquire a measured RSSI value (e.g., in decibel milliwatts or dBm) for this signal. This measured RSSI value may then be used to determine an adjusted/calculated RSSI value, for instance through a lookup table to again account for the dynamic range. The RSSI values used in Equations 1-5 above are the noted adjusted/calculated RSSI values.

Consider the case where there is a 10 meter spacing between an adjacent pair of antennas. A representative lookup table that may be used to provide the RSSI values for Equations 1-5 in such a case is as follows (the adjusted/calculated RSSI values being in the "RSSI Calc." column):

| Frequency (MHz) | Distance (km) | Path Loss (dB) | PTx (dBm) | GTx (dBi) | GRx (dBi) | RSSI Meas. (dBm) | dB Loss Ind. | RSSI Calc. |
|---|---|---|---|---|---|---|---|---|
| 2400 | 0.0005 | 34.02362492 | 16 | −22 | 1 | −41.024 | 34.024 | 1.3 |
| 2400 | 0.001 | 40.04422483 | 16 | −22 | 1 | −47.044 | 6.021 | 2.6 |
| 2400 | 0.0015 | 43.56605002 | 16 | −22 | 1 | −50.566 | 3.522 | 3.9 |
| 2400 | 0.002 | 46.06482475 | 16 | −22 | 1 | −53.065 | 2.499 | 5.2 |
| 2400 | 0.0025 | 48.00302501 | 16 | −22 | 1 | −55.003 | 1.938 | 6.5 |
| 2400 | 0.003 | 49.58664993 | 16 | −22 | 1 | −56.587 | 1.584 | 7.8 |
| 2400 | 0.0035 | 50.92558572 | 16 | −22 | 1 | −57.926 | 1.339 | 9.1 |
| 2400 | 0.004 | 52.08542466 | 16 | −22 | 1 | −59.085 | 1.160 | 10.4 |
| 2400 | 0.0045 | 53.10847511 | 16 | −22 | 1 | −60.108 | 1.023 | 11.7 |
| 2400 | 0.005 | 54.02362492 | 16 | −22 | 1 | −61.024 | 0.915 | 13 |
| 2400 | 0.0055 | 54.85147862 | 16 | −22 | 1 | −61.851 | 0.828 | 14.3 |
| 2400 | 0.006 | 55.60724984 | 16 | −22 | 1 | −62.607 | 0.756 | 15.6 |
| 2400 | 0.0065 | 56.30249197 | 16 | −22 | 1 | −63.302 | 0.695 | 16.9 |
| 2400 | 0.007 | 56.94618563 | 16 | −22 | 1 | −63.946 | 0.644 | 18.2 |
| 2400 | 0.0075 | 57.5454501 | 16 | −22 | 1 | −64.545 | 0.599 | 19.5 |
| 2400 | 0.008 | 58.10602457 | 16 | −22 | 1 | −65.106 | 0.561 | 20.8 |
| 2400 | 0.0085 | 58.63260335 | 16 | −22 | 1 | −65.633 | 0.527 | 22.1 |
| 2400 | 0.009 | 59.12907502 | 16 | −22 | 1 | −66.129 | 0.496 | 23.4 |
| 2400 | 0.0095 | 59.59869694 | 16 | −22 | 1 | −66.599 | 0.470 | 24.7 |
| 2400 | 0.01 | 60.04422483 | 16 | −22 | 1 | −67.044 | 0.446 | 26 |

Equations 1, 2, and 3 may be executed by the processing system 532 of the object location determination module 530 to compute the location of the object 560 in the first dimension 556, while Equations 4 and 5 may be executed by the processing system 532 of the object location determination module 530 to compute the location of the object 560 in the second dimension 558. It may be that only one of Equations 1-3 need be executed by the processing system 532 of the object location determination module 530 to compute the location of the object 560 in the first dimension 556, although two or more of the Equations 1-3 may be executed by the processing system 532 of the object location determination module 530 to compute the location of the object 560 in the first dimension 556 (e.g., to increase the confidence level of the determined location). Similarly it may be that only one of Equations 4-5 need be executed by the processing system 532 of the object location determination module 530 to compute the location of the object 560 in the second dimension 558, although each of Equations 4 and 5 may be executed by the processing system 532 of the object location determination module 530 to compute the location of the object 560 in the second dimension 558 (e.g., to increase the confidence level of the determined location). At least one determined distance in the first dimension 556 (e.g., $X_1$, $X_2$, $X_3$), in conjunction with the known location of the relevant antennas in the first dimension 556, may be used to determine the location of the object 560 in the first dimension 556. Similarly, at least one determined distance in the second dimension 558 (e.g., $Y_1$, $Y_2$), in conjunction with the known location of the relevant antennas in the second dimension 558, may be used to determine the location of the object 560 in the second dimension 558.

One or more features may be incorporated by the object location determination module 530 to enhance/address the reliability of the determined locations. For instance, boundary conditions may be established for the computed RSSI values (e.g., computed RSSI values that are not within the boundary conditions may be disregarded, may result in an issuance of an alert (e.g., to an operator), or both). To ensure accuracy and reduce the potential degradation of the object location determination module 530, a free space path loss algorithm can be employed along with a link budget. Since the weighted algorithm can calculate the distance and location, the free space path loss calculation can provide some redundancy in verifying the signal strength expected at that location. Depending on the obstruction caused by ULDs 570 or an operator, fading may impact the accuracy of the free space path loss calculation. There are algorithms to account for these losses, as well as any doppler affects due to moving cargo or operators. Limits can be set that would indicate degradation of the object location determination module 530 or an obstruction, including from a link budget and loss standpoint. These added safety checks would further increase the fidelity of the object location determination module 530.

Figure 8:
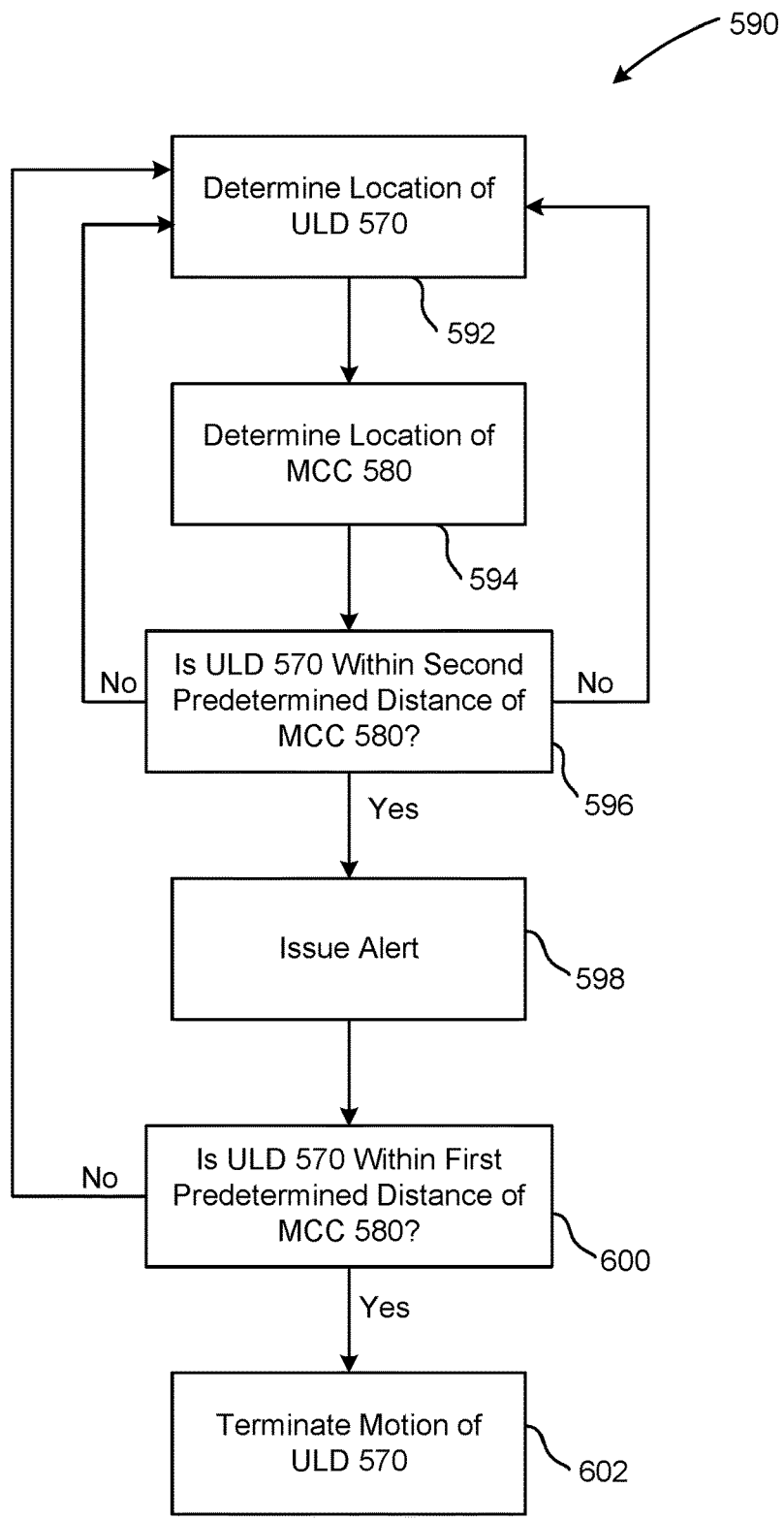
FIG. 8 is a cargo handling protocol that may be used by the cargo handling system of FIG. 5, in accordance with various embodiments.

FIG. 8 presents a cargo handling protocol 590 that may be utilized/executed by the cargo handling system 520 of FIG. 5. The location of a ULD 570 in the cargo compartment 540 is determined (592), along with a location of a mobile cargo controller 580 in the cargo compartment 540 (594). These determinations (592, 594) may be made by the object location determination module 530, and including in the above-noted manner. There may be applications where location determinations will be provided in relation to only ULDs 570 or mobile cargo controllers 580. In any case and in the event that the ULD 570 is determined to be within a second predetermined distance (e.g., stored in the memory 534 of the object location determination module 530) of the mobile cargo controller 580 (596), an alert may be issued (598). This alert (596) may be of any appropriate type, for instance a visual and/or audible notification to an operator. Such an alert (596) may be provided via the mobile cargo controller 580, for instance.

The protocol 590 also monitors the location of the ULD 570 (592) and the location of the mobile cargo controller 580 (594) to determine if the ULD 570 and the mobile cargo controller 580 are within a first predetermined distance (e.g., stored in the memory 534 of the object location determination module 530) of each other (600), where this first predetermined distance is less than the second predetermined distance associated with issuance of an alert (598). If the determination is made that the ULD 570 is within the first predetermined distance of the mobile cargo controller 580, motion of the ULD 570 may be terminated (602). The location of the ULD 570 (592) and the mobile cargo controller 580 may be determined on a repeated basis (e.g., periodically) for purposes of assessing for issuance of an alert (596, 598), termination of motion of the ULD 570 (600, 602), or both.

Instead of using the second predetermined distance (596) and first predetermined distance (600), the protocol 590 could be configured such that the determined location of the ULD 570 (592) and the determined location of the mobile cargo controller 580 (594) is used to determine if the ULD 570 and mobile cargo controller 580 are in the same zone of the cargo compartment (540) (via an adaption of 596). An alert could be issued (598) if the ULD 570 and the mobile cargo controller 580 are determined to be in the same zone of the cargo compartment 540, motion of the ULD 570 could be terminated (602) if the ULD 570 and the mobile cargo controller 580 are determined to be in the same zone of the cargo compartment 540, or both.

In various embodiments, the memory 534 of the object location determination module 530 is configured to store information used execution of the cargo handling protocol 590. In various embodiments, the memory 534 comprises a computer-readable storage medium, which, in various embodiments, includes a non-transitory storage medium. In various embodiments, the term "non-transitory" indicates that the memory 534 is not embodied in a carrier wave or a propagated signal. In various embodiments, the non-transitory storage medium stores data that, over time, changes (e.g., such as in a random access memory (RAM) or a cache memory). In various embodiments, memory 534 comprises a temporary memory. In various embodiments, memory 534 comprises a volatile memory. In various embodiments, the volatile memory includes one or more of RAM, dynamic RAM (DRAM), static RAM (SRAM), and/or other forms of volatile memories. In various embodiments, memory 534 is configured to store computer program instructions for execution by processing system 532. In various embodiments, applications and/or software running for the object location determination module 530 utilize(s) memory 534 in order to temporarily store information used during program execution. In various embodiments, memory 534 includes one or more computer-readable storage media. In various embodiments, memory 534 is configured to store larger amounts of information than volatile memory. In various embodiments, memory 534 is configured for longer-term storage of information. In various embodiments, memory 534 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, processing system 532 is configured to implement functionality and/or process instructions. In various embodiments, processing system 532 is configured to process computer instructions stored in memory 534. In various embodiments, processing system 532 includes one or more of a microprocessor, a controller, a digital signal processor (DSP), an application specific integrated circuit (ASIC), a field-programmable gate array (FPGA), or other equivalent discrete or integrated logic circuitry.

System program instructions and/or processor instructions may be loaded onto memory 534. The system program instructions and/or processor instructions may, in response to execution by operator, cause processing system 532 to perform various operations. In particular, and as described in further detail below, the instructions may allow processing system 532 to determine the location of a ULD, a mobile cargo controller, or both. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

A number of benefits are associated with a cargo loading/handling system that utilizes the object location determination module 530. One is that it provides a wireless solution for mapping cargo and operators within a cargo bay/cargo compartment (e.g., wire reduction). The object location determination module 530 may be used to validate the load plan for the relevant cargo bay/cargo compartment, to store location information on the final location of each ULD in the cargo bay/cargo compartment, or both (versus manually, which is time consuming/labor intensive/costly). Safety of loading/unloading operations is also enhanced (e.g., via the alert (598) and motion termination (602) features of the cargo handling protocol 590 of FIG. 8).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

We claim:

1. A method of operating a cargo handling system, comprising:
   determining a location of a unit load device (ULD) within a cargo compartment;
   moving said ULD within said cargo compartment; and
   determining a location of a mobile cargo controller within said cargo compartment.

2. The method of claim 1, further comprising:
   terminating motion of said ULD in response to a determination that said ULD is within a first predetermined distance of said mobile cargo controller.

3. The method of claim 2, further comprising:
   issuing an alert in response to a determination that said ULD is within a second predetermined distance of said mobile cargo controller, wherein said second predetermined distance is greater than said first predetermined distance.

4. The method of claim 1, further comprising:
   terminating motion of said ULD in response to a determination that said ULD and said mobile cargo controller are in a common zone of said cargo compartment.

5. The method of claim 1, further comprising:
   issuing an alert in response to a determination that said ULD and said mobile cargo controller are within a predetermined distance of each other.

6. The method of claim 1, further comprising:
   issuing an alert in response to a determination that said ULD and said mobile cargo controller are in a common zone of said cargo compartment.

7. The method of claim 1, wherein said determining for said ULD comprises transmitting a first signal from a first transmitter incorporated by said ULD, and wherein said determining for said mobile cargo controller comprises transmitting a second signal from a second transmitter incorporated by said mobile cargo controller.

8. The method of claim 7, wherein a first dimension and a second dimension are orthogonal to each other, and wherein said determining for said ULD comprises determining a location of said ULD in said second dimension comprising using:
   a first received signal strength indicator (RSSI) value corresponding with said first signal received by a first longitudinal antenna that extends longitudinally in said first dimension;
   a second RSSI value corresponding with said first signal received by a second longitudinal antenna that extends longitudinally in said first dimension, wherein said first longitudinal antenna and said second longitudinal antenna are parallel; and
   a spacing between said first longitudinal antenna and said second longitudinal antenna.

9. The method of claim 8, wherein said determining for said ULD comprises determining a location of said ULD in said first dimension comprising using:
   a third RSSI value corresponding with said first signal received by a third longitudinal antenna that extends longitudinally in said second dimension;
   a fourth RSSI value corresponding with said first signal received by a fourth longitudinal antenna that extends longitudinally in said second dimension, wherein said third longitudinal antenna and said fourth longitudinal antenna are parallel; and
   a spacing between said third longitudinal antenna and said fourth longitudinal antenna.

10. The method of claim 9, wherein said determining for said mobile cargo controller comprises determining a location of said mobile cargo controller in said second dimension comprising using:
- a fifth received signal strength indicator (RSSI) value corresponding with said second signal received by said first longitudinal antenna;
- a sixth RSSI value corresponding with said second signal received by said second longitudinal antenna; and
- said spacing between said first longitudinal antenna and said second longitudinal antenna.

11. The method of claim 10, wherein said determining for said mobile cargo controller comprises determining a location of said mobile cargo controller in said first dimension comprising using:
- a seventh RSSI value corresponding with said second signal received by said third longitudinal antenna;
- an eighth RSSI value corresponding with said second signal received by said fourth longitudinal antenna; and
- said spacing between said third longitudinal antenna and said fourth longitudinal antenna.

12. The method of claim 9, wherein each of said first longitudinal antenna, said second longitudinal antenna, said third longitudinal antenna, and said fourth longitudinal antenna comprises a leaky feeder antenna.

* * * * *

UNITED STATES PATENT AND TRADEMARK OFFICE
CERTIFICATE OF CORRECTION

| | | |
|---|---|---|
| PATENT NO. | : 11,675,043 B1 | Page 1 of 1 |
| APPLICATION NO. | : 17/537130 | |
| DATED | : June 13, 2023 | |
| INVENTOR(S) | : Ryan C. Ring | |

It is certified that error appears in the above-identified patent and that said Letters Patent is hereby corrected as shown below:

On the Title Page

Item [65] please insert --Prior Publication Data US 2023/0168337 A1 Jun. 1, 2023--

Signed and Sealed this
Thirteenth Day of August, 2024

Katherine Kelly Vidal
*Director of the United States Patent and Trademark Office*